United States Patent [19]
Gerszberg et al.

[11] Patent Number: 6,020,916
[45] Date of Patent: Feb. 1, 2000

[54] VIDEOPHONE MULTIMEDIA INTERACTIVE ON-HOLD INFORMATION MENUS

[75] Inventors: Irwin Gerszberg, Kendall Park; Jeffrey S. Martin, Dover; Hopeton S. Walker, Haledon, all of N.J.

[73] Assignee: AT&T Corp, New York, N.Y.

[21] Appl. No.: 09/001,356

[22] Filed: Dec. 31, 1997

[51] Int. Cl.$^7$ .................................................. H04N 7/14
[52] U.S. Cl. ............................ 348/15; 348/14; 379/93.17
[58] Field of Search ................................. 348/14, 15, 16; 379/93.17, 93.19, 93.21, 93.23; 345/349, 356, 969

[56] References Cited

U.S. PATENT DOCUMENTS

| | | |
|---|---|---|
| 3,859,474 | 1/1975 | Gueldenpfennig et al. ............ 379/212 |
| 4,456,925 | 6/1984 | Skerlos et al. . |
| 4,560,833 | 12/1985 | Weber et al. ............................... 179/2 |
| 4,620,289 | 10/1986 | Chauvel . |
| 4,725,694 | 2/1988 | Auer et al. . |
| 4,916,441 | 4/1990 | Gombrich . |
| 5,014,267 | 5/1991 | Tompkins et al. . |
| 5,157,717 | 10/1992 | Hitchcock . |
| 5,321,740 | 6/1994 | Gregorek ............................ 379/100.06 |
| 5,335,276 | 8/1994 | Thompson et al. . |
| 5,393,964 | 2/1995 | Hamilton et al. . |
| 5,406,615 | 4/1995 | Miller, II et al. . |
| 5,488,412 | 1/1996 | Majeti et al. . |
| 5,512,935 | 4/1996 | Majeti et al. . |
| 5,534,913 | 7/1996 | Majeti et al. . |
| 5,546,316 | 8/1996 | Buckley et al. . |
| 5,561,604 | 10/1996 | Buckley et al. . |
| 5,572,005 | 11/1996 | Hamilton et al. . |
| 5,583,922 | 12/1996 | Davis et al. .......................... 379/93.17 |
| 5,583,965 | 12/1996 | Douma et al. . |
| 5,584,054 | 12/1996 | Tyneski et al. . |
| 5,587,735 | 12/1996 | Ishida et al. . |
| 5,594,859 | 1/1997 | Palmer et al. ........................... 395/330 |
| 5,619,684 | 4/1997 | Goodwin et al. . |
| 5,644,628 | 7/1997 | Schwarzer et al. ..................... 379/354 |
| 5,671,267 | 9/1997 | August et al. . |
| 5,682,195 | 10/1997 | Hendricks et al. . |
| 5,684,918 | 11/1997 | Abecassis . |
| 5,689,641 | 11/1997 | Ludwig et al. ............................ 348/16 |
| 5,751,965 | 5/1998 | Mayo et al. ........................ 395/200.54 |
| 5,835,130 | 11/1998 | Read et al. ................................ 348/14 |

*Primary Examiner*—Curtis A. Kuntz
*Assistant Examiner*—Melur Ramakrishnaiah

[57] ABSTRACT

Apparatus and methods for video teleconferencing with a plurality of parties, as well as for providing multimedia on-hold information. A videophone may be used to view and communicate with the parties simultaneously and/or individually. Link maps may also be displayed indicating the topography of the conference call links. The links may be rearranged and/or otherwise controlled by touching a touchscreen display on the videophone.

21 Claims, 10 Drawing Sheets

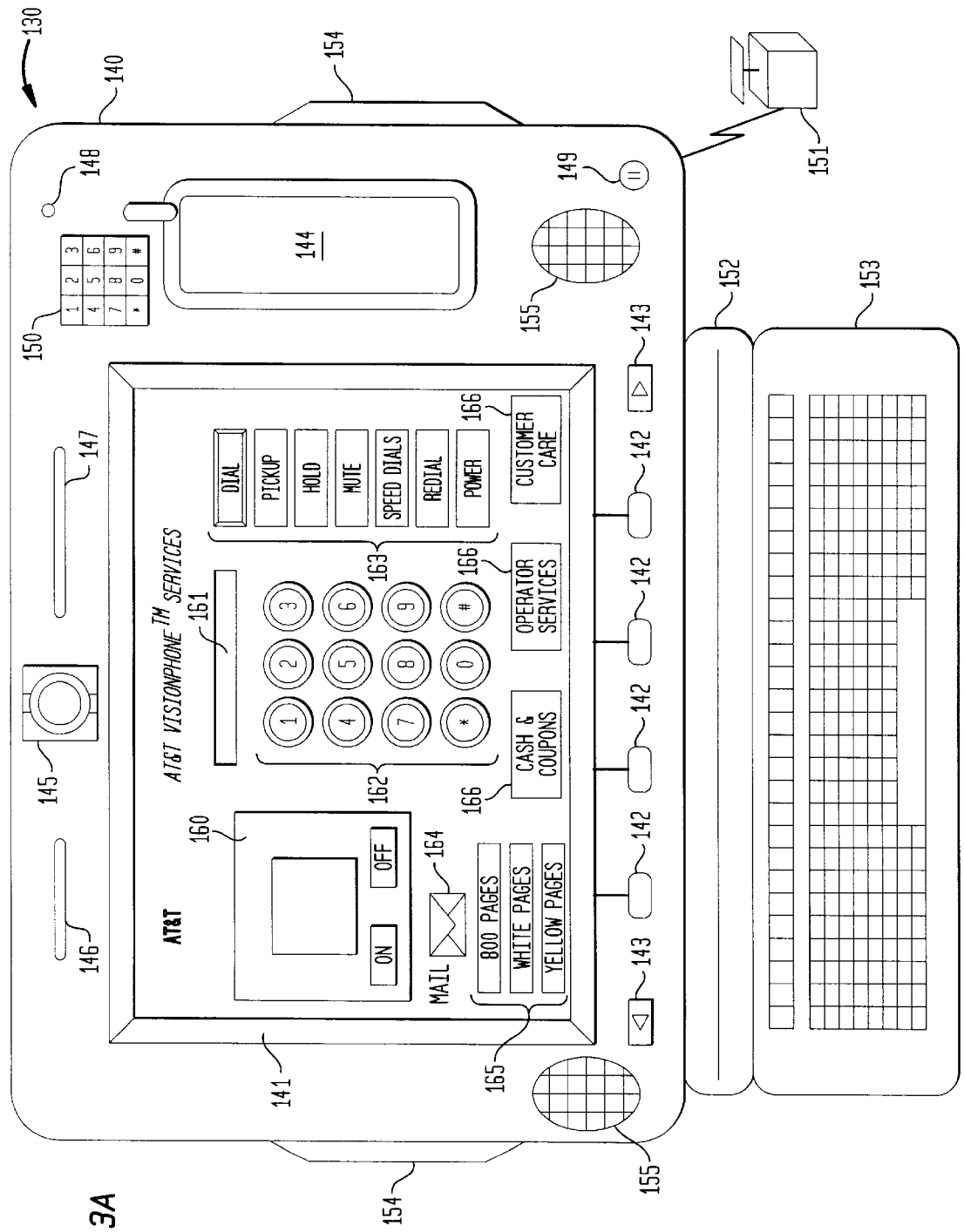

VIDEOPHONE MULTIMEDIA INTERACTIVE ON-HOLD INFORMATION MENUS

FIELD OF THE INVENTION

The present invention is directed generally to apparatus and methods for video teleconferencing with a plurality of parties, and particularly to apparatus and methods for viewing and communicating with multiple parties simultaneously on a videophone.

BACKGROUND

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the type of DSL modem provided by the local telephone company must also be provided to the end user in the customer premises equipment (CPE). Additionally, since the network is not completely controlled by the interexchange companies, it is difficult for the interexchange companies to provide data at committed delivery rates. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

As part of this system, there is a need for improved architectures, services and equipment utilized to distinguish the interexchange companies' products and services. For instance, there is a need for apparatus and methods for teleconferencing with a plurality of parties. Conventional teleconferencing is inconvenient, and it is often difficult for a party to know which parties are interconnected at any given time. Furthermore, it is difficult using current systems to communicate between only a subset of the parties while all of the parties are interconnected. These problems are exacerbated when video teleconferencing is attempted.

SUMMARY OF THE INVENTION

In order to provide an improved network, it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a video phone and/or other devices to provide new services to an end user; an intelligent services director (ISD) disposed near the customer's premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

As part of this system, one aspect of the present invention provides a videophone system that displays video windows and/or icons representing some or all of the parties involved in a teleconference. The videophone system may also indicate links between some or all of the parties. The user of a videophone may control links using, for example, a touch screen display.

Another aspect of the invention provides a videophone system that displays a link map. The link map may include video windows and/or icons arranged to illustrate the topography of a teleconferencelink.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 3A and 3B illustrate an embodiment of a video phone consistent with the architecture shown in FIG. 1.

DETAILED DESCRIPTION OF PREFERRED EMBODIMENTS

Figure 1:
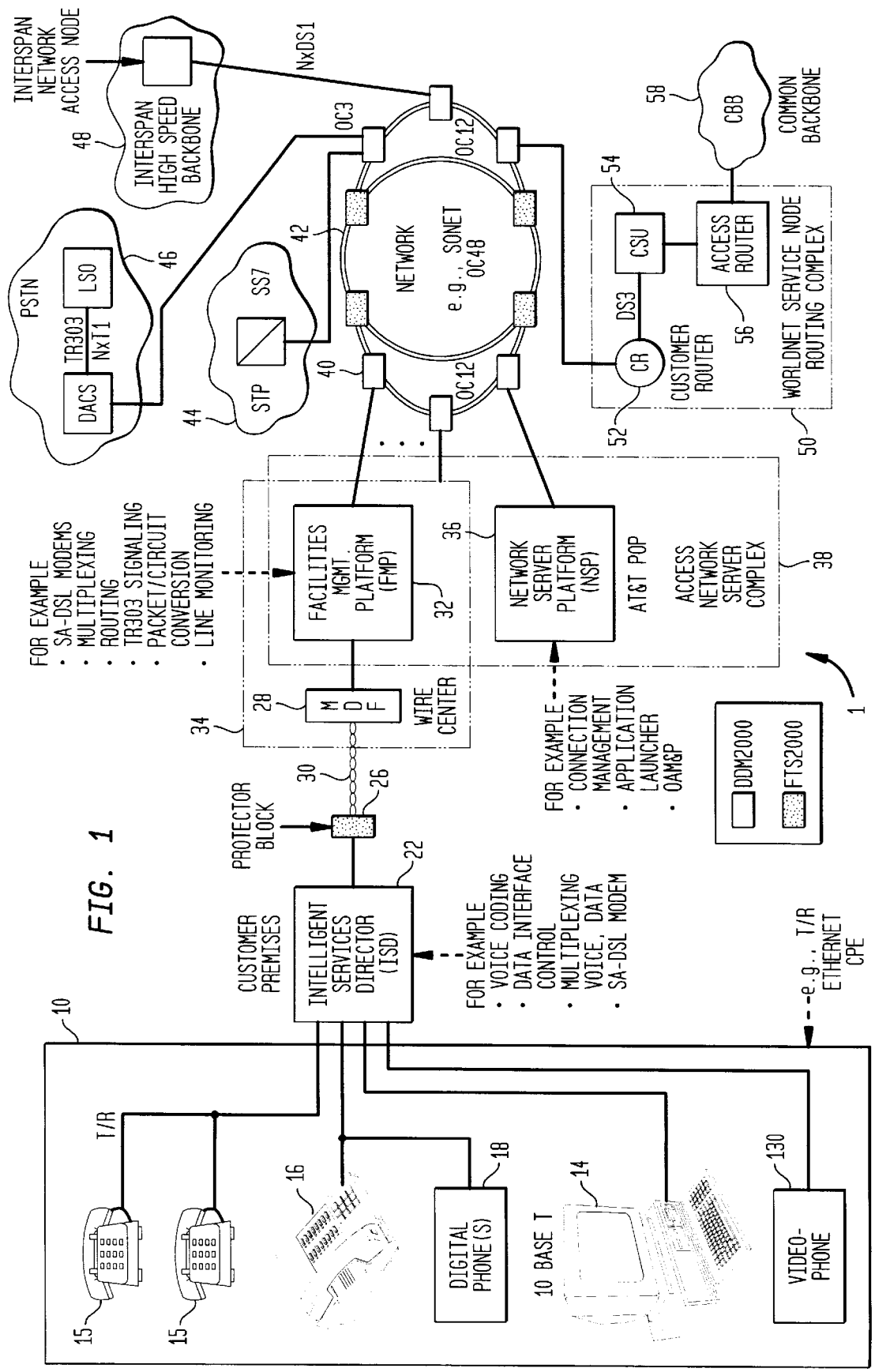
FIG. 1 illustrates an embodiment of a hybrid fiber twisted pair local loop architecture.

Referring to FIG. 1, a first exemplary communication network architecture employing a hybrid fiber, twisted-pair (HFTP) local loop 1 architecture is shown. An intelligent services director (ISD) 22 may be coupled to a central office 34 via a twisted-pair wire, hybrid fiber interconnection, wireless and/or other customer connection 30, a connector block 26, and/or a main distribution frame (MDF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber-optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks.

The NSP 36 may provide a massive cache storage for various information that may be provided across the SONET net 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services.

The ISD 22 may be interconnected to various devices such as a videophone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply reloading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure widespread availability of the new features made possible by the present architecture, the customer premise equipment may be provided to end users either at a subsidized cost or given away for free, with the cost of the equipment being amortized over the services sold to the user through the equipment.

Figure 2:
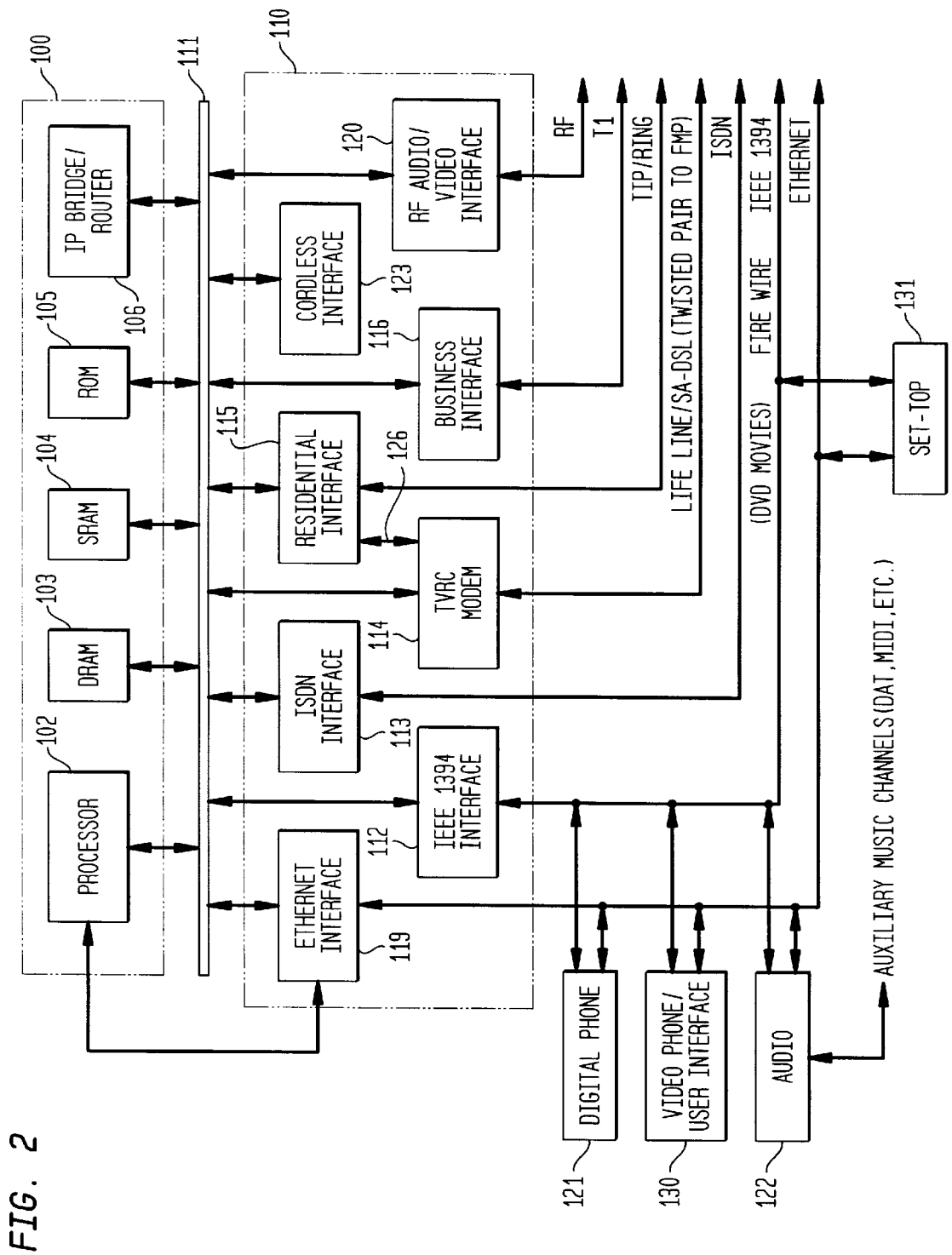
FIG. 2 is a block diagram of an embodiment of an intelligent services director consistent with the architecture shown in FIG. 1.

Referring to FIG. 2, the ISD 22 may connect with a variety of devices including analog and digital voice telephones 15, 18; digital videophones 130, devices for monitoring home security, meter reading devices (not shown), utilities devices/energy management facilities (not shown), facsimile devices 16, personal computers 14, and/or other digital or analog devices. Additionally the service provider may collect fees from advertisers to subsidize the cost of the equipment. Some or all of these devices may be connected with the ISD 22 via any suitable mechanism such as a single and/or multiple twisted-pair wires, fiber, and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem.

As shown in FIG. 2, in some embodiments the ISD 22 may include a controller 100 which may have any of a variety of elements such as a central processing unit 102, a DRAM 103, an SRAM 104, a ROM 105 and/or an internet protocol (IP) bridge router 106 connecting the controller 100 to a system bus 111. The system bus 111 may be connected with a variety of network interface devices 110. The network interface devices 110 may be variously configured to include an integrated services digital network (ISDN) interface 113, an Ethernet interface 119 (e.g., 10 Base T, 100 Base T, etc.), an IEEE 1394 "fire wire" interface 112 (e.g., for a digital videodisc device (DVD)), a TVRC modem interface 114 (e.g., for a digital subscriber line (DSL) modem), a residential interface 114, (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone/ user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the ISD 22 to the local telecommunications company's central office 34 and, in particular, to the FMP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, digital phones, 121 and/or another suitable device such as a settop device 131.

In further embodiments, the ISD 22 may be configured as an IP proxy server such that each of the devices connected to the server utilizes transmission control protocol/internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the video telephone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/movie in real time for immediate viewing and/or into storage for later viewing.

Figure 3B:
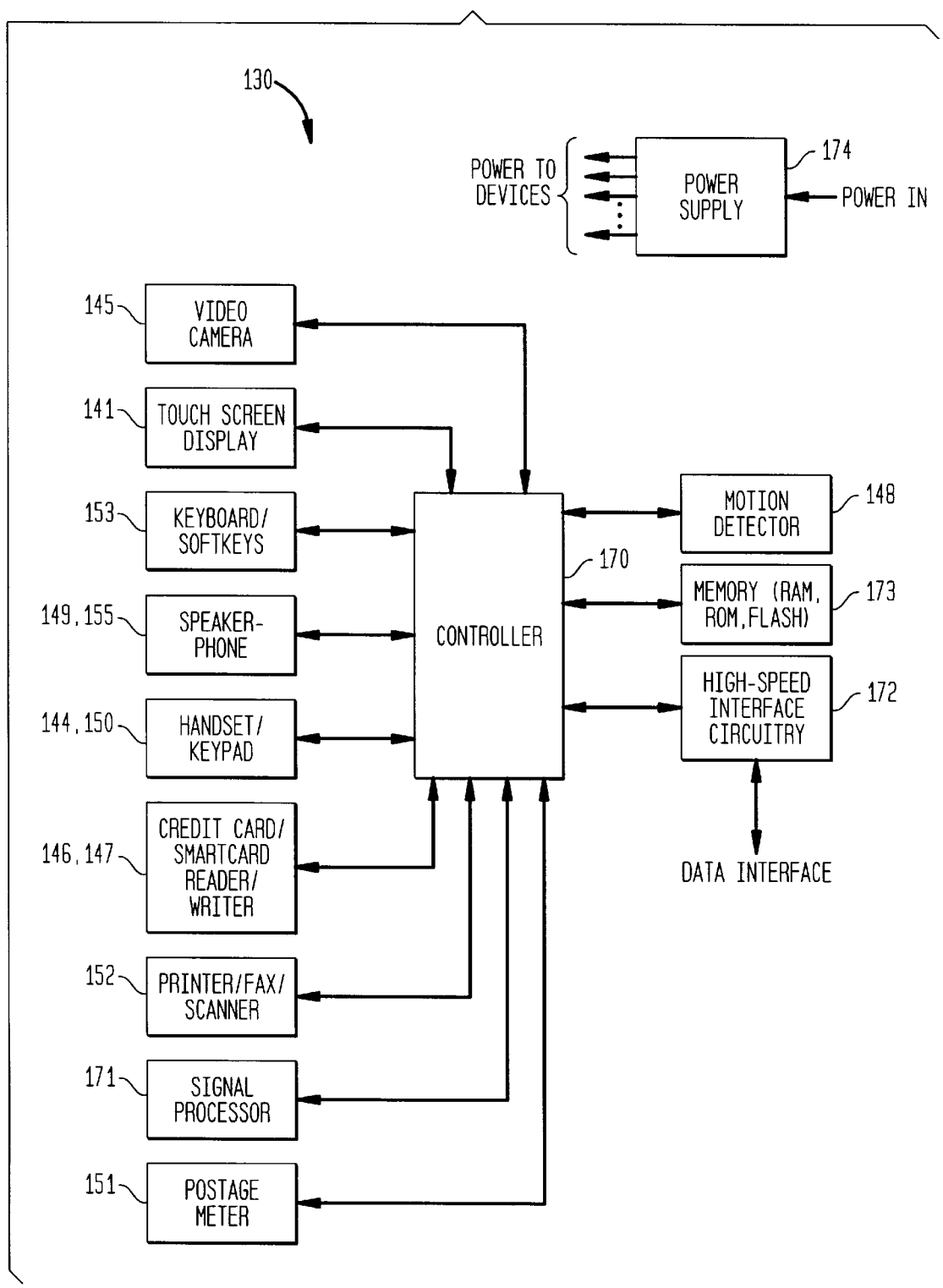

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170.

When the videophone 130 is used as a video telephone, the display 141 may include one or more video window(s) 160 for viewing a person to whom a user is speaking and/or showing the picture seen by the person on the other end of the video phone. The display may also include a dialed-telephone-number window 161 for displaying the phone number dialed, a virtual keypad 162, virtal buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Figure 4A:
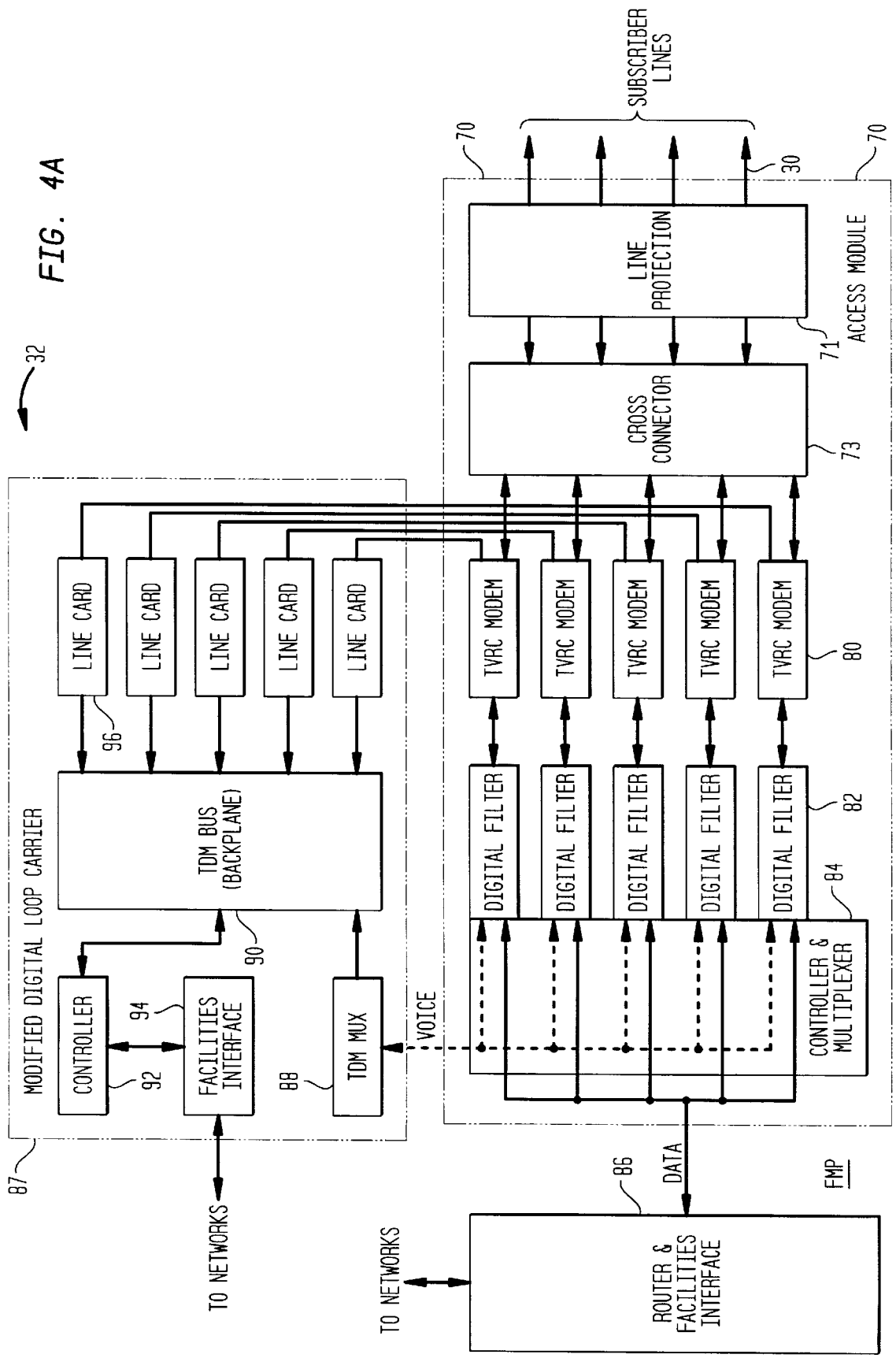
FIG. 4A is a block diagram of an embodiment of a facilities management platform consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments that for transport across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (IDM) multiplexor (MUX) 88, a TDM bus 90, a controller 92, and/or a facilities interface 94.

During normal operations, digital signals on the customer connection 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexor 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexor 84, and the TDM MUX 88. Thus, voice communication is ensured despite a failure of the digital data link. The line cards 96 may convert the analog voice signals into digital format (e.g., TDM format) and send the digitized voice data onto the IDM bus 90 and eventually through the controller 92 and the facilities interface 94 for transmission to one or more external networks.

Figure 4B:
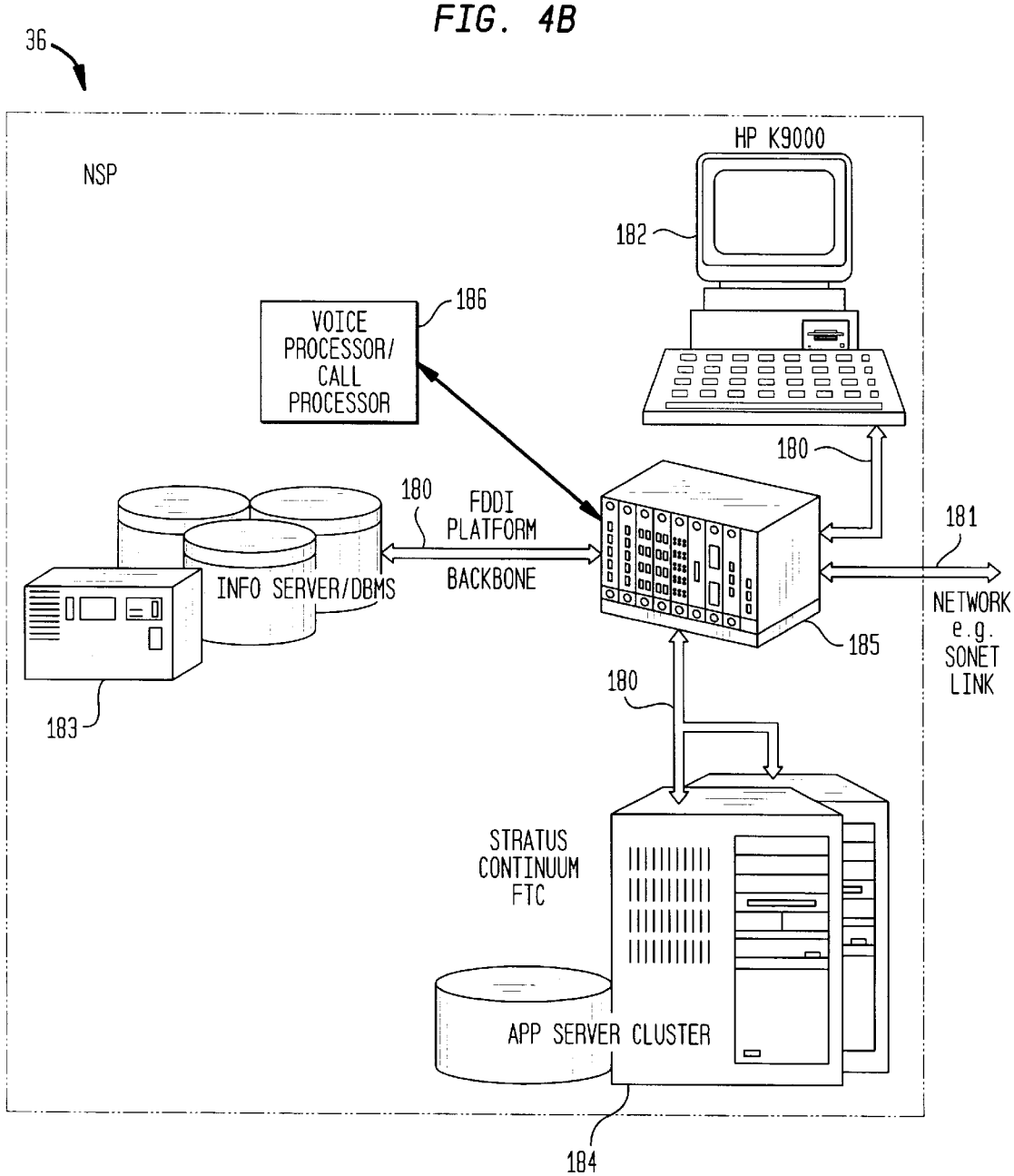
FIG. 4B illustrates a block diagram of an embodiment of a network server platform consistent with the architecture shown in FIG. 1.

Referring to FIG. 4B, the NSP 36 may be variously configured to provide any number of services provided by a server such as information services, Internet services, pay-per-view movie services, data-base services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMPs 32. The information/data base server 183 may perform storage and/or database functions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

In some embodiments, the videophone 130 may be used for teleconferencing with a plurality of other analog telephones, videophones, other digital telephones, personal computers, and/or other communication devices. When the videophone 130 conference calls with a plurality of other phones, it may simultaneously communicate with some or all of the other phones, and the other phones may simultaneously communicate among each other.

Figure 5:
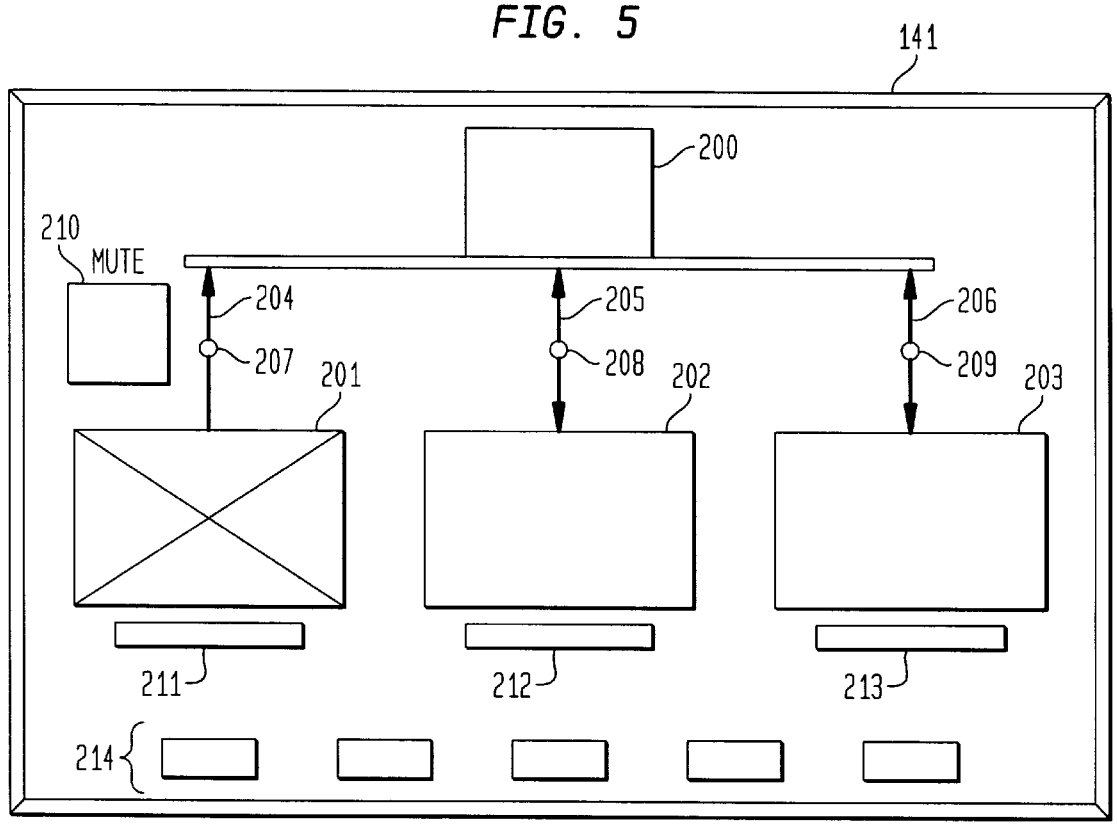
FIG. 5 illustrates an embodiment of the display of the videophone shown in FIG. 3A.

FIG. 5 illustrates an exemplary embodiment of the display 141 of a videophone 130 when the videophone 130 is teleconferencing with three other parties. In FIG. 5, the other three parties are using videophones. If one or more of the phones with which the videophone 130 is teleconferencing is not a videophone (i.e., does not send video), then a blank screen or an icon representing that phone may be shown instead. The display 141 of the videophone 130 may include a video window 200 for displaying the picture that the camera 145 receives and/or a plurality of video windows 201–203 for displaying video from the other three videophones. Depending upon how many parties are teleconferencing with each other, different numbers of video windows 201–203 may appear. Thus, Party A may be represented by video window 201, Party B by video window 202, and Party C by video window 203. The user of the videophone 130 (e.g., Party D) may be represented by video window 200. There may be a variety of other features such as other video windows (e.g., pop-up video window 210) that may appear as needed for various purposes.

Link icons 204–206 may indicate the status of a link between the videophone 130 and each of the other parties. The link icons 201–203 may include link buttons 207–209 which may be used to control the links, such as blocking some or all of the link and/or controlling the bandwidth or direction of the link. Links may be one or two-way, audio, video, and/or data type links.

Status bars 211–213 may graphically and/or textually display status of the links, including elapsed call time, party identification, line quality, link type, and/or other data. The display 141 may also show a plurality of function buttons 214 for performing various functions such as establishing/terminating connections, muting, displaying link maps, and/or other telephone or teleconferencing functions.

Although the video windows 201–203 are arranged in FIG. 5 to be of equal size and equally distributed within the display 141, they may be of different shapes and sizes and may be variously arranged. The user of the videophone 130 may control the shapes, sizes, and/or layout of the video windows 200–203. Furthermore, the video windows 200–203 may automatically arrange themselves depending upon the relative locations of the other parties, the topography of the link, and/or which party was the originating party.

The user of the videophone 130 may mute/suppress the outgoing audio and/or video to one or more of the other videophones. The user may control muting by, for example, touching a video window and/or touching a function button 214. The display 141 may indicate muting in a number of ways, including, for example, drawing a red "X" across a video screen (e.g., as shown for video screen 201), displaying "mute" in association with a video screen, displaying appropriate arrow heads on the link icons (e.g., as shown for link icon 204, which only has an arrow head pointing away from video window 201), and/or any other method for letting the user of the videophone 130 know of the mute status. When mute is enabled, a pop-up video window 210 may appear showing what the videophone being muted is receiving. When outgoing audio and/or video to a particular party is muted, that party may see a frozen video screen, a blank screen, an icon, text, a short repeating loop of the last few moments of video, and/or any other video effects such as intermittent freeze frame, slow motion video, and/or distortion.

Private messages, audio, and/or video may be sent between a subset of the users who are teleconferencing with each other. For example, a message may be sent exclusively between the user of the videophone 130 and the user displayed in video window 202. Such a message may be displayed in a status bar 211, a video window 201–202, in a separate pop-up window 210, or anywhere else on the display 141.

Figure 6:
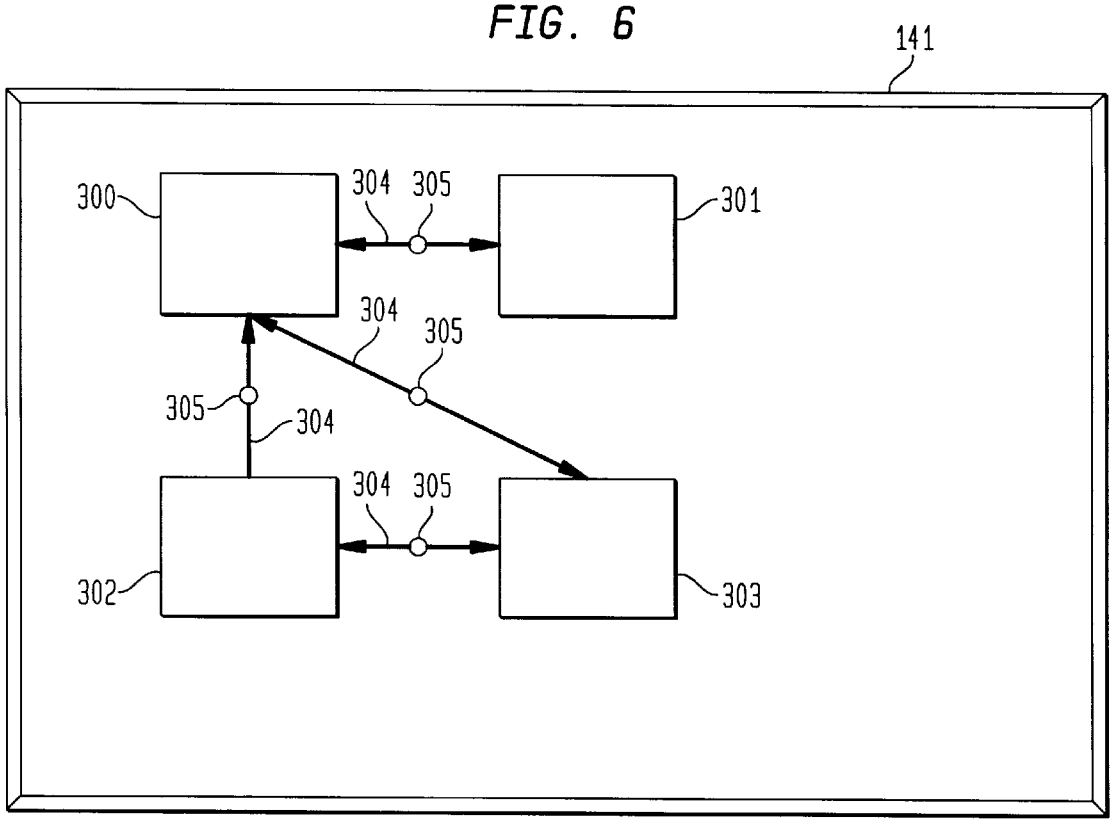
FIG. 6 illustrates another embodiment of the display of the videophone shown in FIG. 3A.

Referring to FIG. 6, one or more link maps may be displayed. A link map may illustrate the topography of some or all of the links interconnecting the parties. The link map may include a plurality of video windows 300–303. Some or all of the video windows 300–303 may be interconnected by link icons 305. The link icons 305 may be arrows and may have link buttons 305 as described above with regard to FIG. 5. Some or all of the features described above with regard to FIG. 5 may be incorporated into the link map illustrated in FIG. 6. In FIG. 6, the parties represented by video windows 300, 302, 303 are shown to be interlinked among each other, while the party represented by video window 301 is shown to be linked only with the party represented by video window 300. Some or all of the link icons 304 and video windows 300–303 may be created, deleted, and/or re-arranged by the user of the videophone 130 and/or other parties to the conference call. If the link map is complex, certain areas of the link map may be zoomed in, and/or certain types of links and/or parties may be filtered out.

When a videophone user calls another party, that party may partially or completely control the content of the audio and/or video output of the user's videophone. In addition to an image of the person who may be using a videophone, the audio/video content may include, for instance, graphics, animation, still pictures, motion video, buttons, video windows, pull-down menus, drop-down lists, tables, graphs, background music or other sounds, and/or computer-generated backgrounds. Such additional content may be overlaid on an image of the person using the videophone and/or in any other combination. Furthermore, the content of the audio/video output to a party may depend upon whether that party is on hold. When putting a caller on hold, the party putting the caller on hold may output on-hold information to the caller including advertisements, information screens, multi-media clips, music, and/or any other entertaing and/or useful items. These types of output may be interactive such that a caller on hold may input information and/or press buttons and/or hot areas of the screen to obtain further information and/or perform other functions described below.

Figure 7:
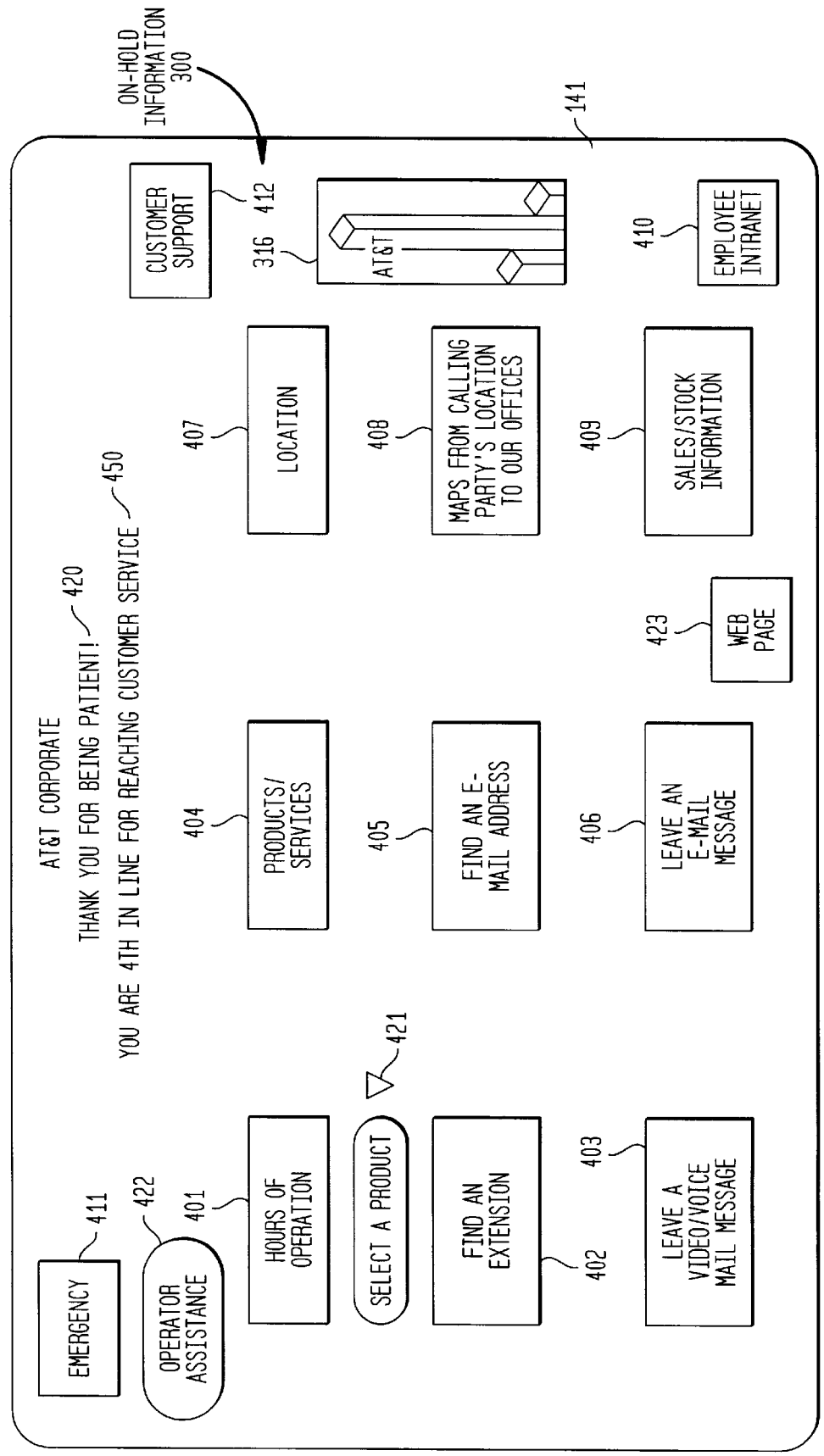
FIG. 7 illustrates multimedia on-hold information which may be utilized by a corporation.
Figure 8:
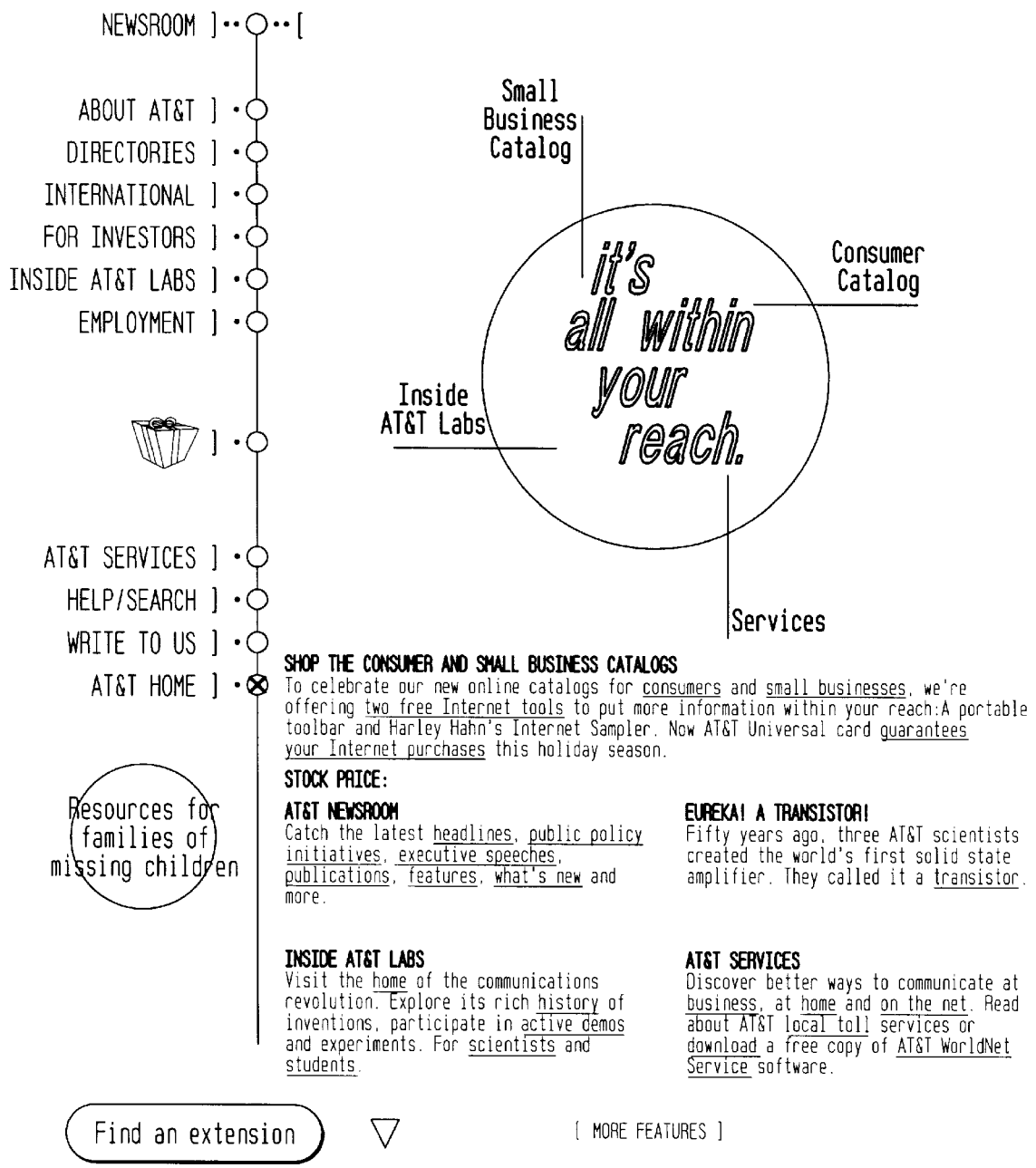
FIG. 8 illustrates an example of a WEB page which may be linked to one or more multimedia on-hold information pages.
Figure 9:
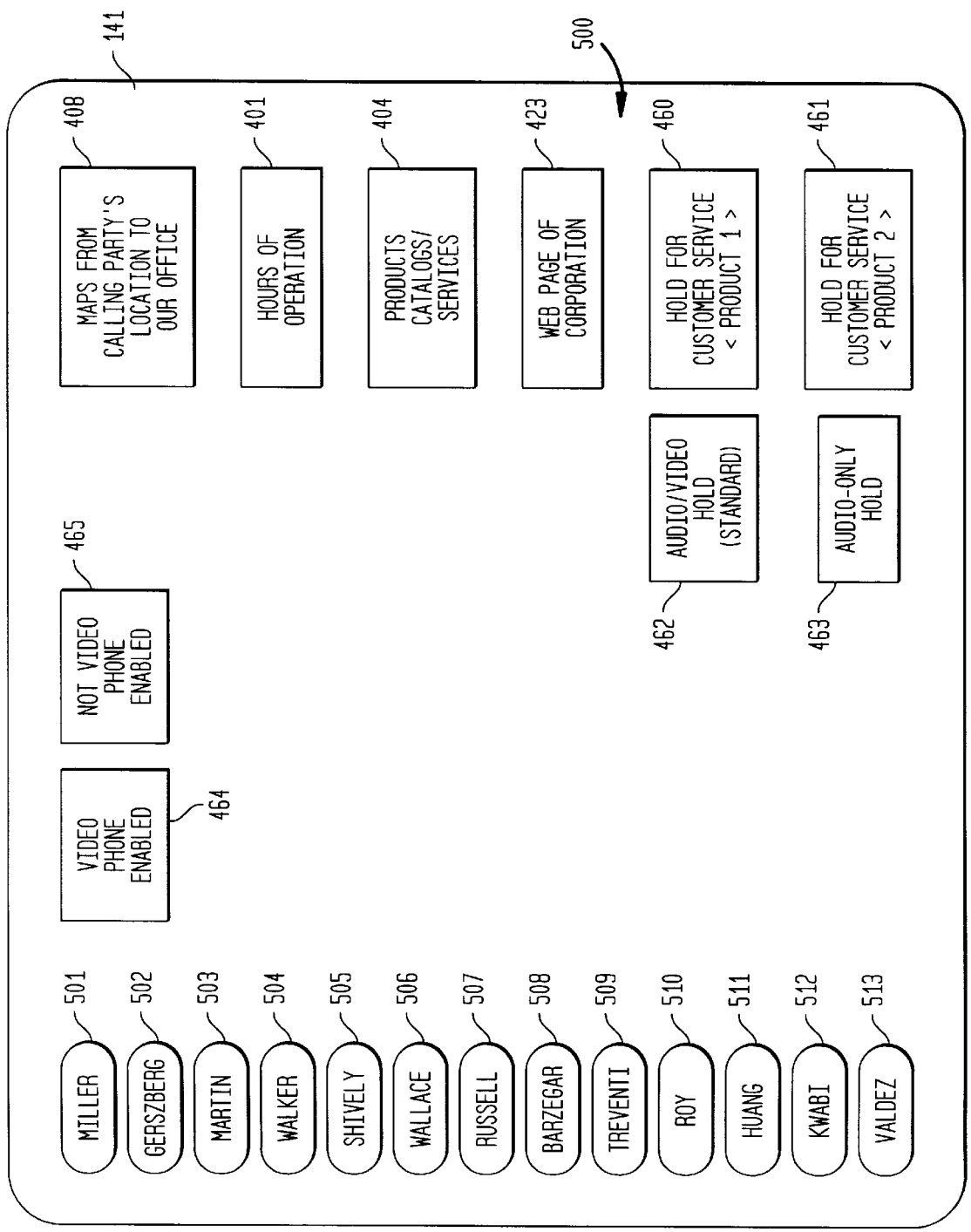
FIG. 9 is one exemplary embodiment of a company's operator control screen for redirecting calls to different individuals within the company and/or to one or more multimedia announcement messages, on-hold information pages, and/or WEB pages.

In one exemplary embodiment, HTML codes and/or a more efficient proprietary protocol geared to telephone networks may be utilized. Where a proprietary protocol is utilized, the proprietary protocol may have certain pre-defined buttons, greetings, and/or key and greeting locations in order to enable complex screens to be presented while using a minimum amount of bandwidth. The predefined keys or hot buttons may include any of the buttons defined herein. A simple code (e.g., two byte identification, two byte location, and two byte color scheme/design) may be sent with the proprietary protocol used to locally reproduce a hot-button while using a minimum amount of transmission bandwidth. Further, standard graphics could also be identified with a code so that these graphics may be received at a NSP 36 which is physically located near the receiving party such that the network bandwidth is not utilized across the entire bandwidth.

Where the calling party is calling from a video enabled phone, a system at the calling party's location such as an ISD 22 attached video phone 130 and/or a private branch exchange (PBX), may detect the presence of the video enabled phone as discussed above and present the calling party with a corporate message as shown, for example, in FIG. 7. Referring to FIG. 7, the information presented to a caller on hold may include a corporate message. The corporate message may be variously configured to include a banner and/or other information message 420, an audio visual message 316 comprising a portion, a substantial portion, and/or all of the display screen 141, and a plurality of graphic icons. These icons may include hot buttons such as "emergency" 411 for automatically dialing a security service, operator assistance 422 for reaching a night-time operator (if any), select a product 421 for finding additional information on a product offered by the company, find an extension 402 for searching for a particular name to find an extension, leave a video/voice mail message 403 allowing the calling party to leave a video and/or voice message for the company, products/services 404 allowing the calling party to access a directory of products and services, find an E-mail address 405 allowing the calling party to search for a particular address, leave an E-mail message 406 allowing a calling party to leave an E-mail message rather than a voice and/or video mail message, location 407 giving the location of the corporation, maps 408 which, when activated, give directions and/or maps from the calling party's address (obtained from the NSP 36) to the corporation, sales/stock information 409 giving a calling party the latest information on the sales/stock of the corporation, customer support 412 allowing the calling party to access customer support information and/or a corporation's WEB page 423 (e.g., via the internet) such as the WEB page shown in FIG. 8 to obtain additional information about the corporation and/or to access WEB based services. The advantage of integrating WEB functionality into video phone based systems is that most corporations already have established WEB servers and support staff. Of course, the audio/video information displayed by a corporate answering machine may be located in any suitable location such as the video phone 130, the ISD 22, the NSP 36 and/or in a video phone enabled PBX/web server located at a corporate site. The on-hold information 300 may also include a message 450 indicating the position in a queue waiting to reach an operator or service representative and/or indicating the estimated time left to wait.

Where the corporation has an operator available, an operator screen such as that shown in FIG. 9 may be displayed. For example, an operator console 500 may present the operator, in addition to the names of individuals within the company, several other options. In one exemplary embodiment, the operator may be presented with an option to transfer a caller to a hot button activated function within the video phone 130, ISD 22, and/or on the NSP 36 and/or to one or more menus and/or submenus of a corporate WEB page. In operation, the operator may transfer the user to either an audio and/or video phone of someone in the corporation 501–513, and/or to one or more menus and/or sub-menus of the corporate message of the on-hold information 300 (e.g., maps 408, hours of operation 401, catalogs/services 404, etc.) and/or to one or more menus and/or submenus of the corporate WEB pages. The operator may also place a caller on hold in various ways, such as by pressing selecting a standard audio/video hold 462 which may connect the caller with, for example, the on-hold information 300 shown in FIG. 7. Alternatively, the operator may connect the caller with specialized on-hold information, such as on-hold information specifically directed towards certain products 460, 461. Such specificallydirected on-hold information may include answers to frequently-asked questions about a product, product specifications, and/or advertisements for the product and/or add-ons for the product. If the call is not video-enabled, the operator may connect the caller with audio-only hold information 463. One or more indications such as graphic icons and/or lights 464, 465 may indicate whether a caller is video-enabled.

The on-hold information may be variously configured to include one or more of the following either alone or in any combination: a video message 355 recorded via camera 145; a video message downloaded from a video playing device such as a digital video camera; a stock video message obtained from a CD (not shown), a stock video message/image obtained from the NSP 36 via the ISD 22 and FMP 32 (e.g., a holiday or seasonal message—Christmas, Thanksgiving, winter, summer, fall, movie star message of a well known movie star with a dubbed audio overlay dynamically recorded, etc.); a still image or photograph scanned in via scanner 152; an audio only message; stock message layouts obtained either locally (via a storage medium, RAM card inserted via smart reader 147, locally attached CD ROM (not shown)) and/or remotely from the NSP contain stock message layouts with the calling party's specific data obtained from a local and/or remote (NSP) database; on-hold information generated locally as discussed in the application entitled VideoPhone Multimedia Announcement Message Toolkit incorporated by reference below; on-hold information which includes one or more of the following control buttons: E-mail 312 to allow an called party to reply via E-mail, please call 313 to allow a caller to simply push a button on the video phone to leave a stock message to the receiving party using one of the customized messages above and/or a stock message to have the called party return the call, will call again 314 to notify the called party that you will try to call again, and/or a plurality of alternate contact buttons 317 to provide direct access via pressing one of the buttons to alternate contact information for the calling party such as an E-mail interface button 301, and/or a plurality of speed dial buttons for automatically dialing various devices such as a pager 302 (including sending of the called parties number), cellular phone 303, work phone 304, vacation home 305, and/or facsimile machine 306 of the calling party.

Referring to FIG. 7, the on-hold information 300 may be customized for a particular number of a calling party. For example, where the calling party is a corporate employee, a different screen may be displayed. The screen may include a screen similar to the operators screen which lists speed dial numbers for each of the other employees, information normally found on the corporations intranet, and/or various hot buttons for the employee to access E-mail, voice mail, and/or video mail.

A further exemplary embodiment, the on-hold information 300 may be customized as described in any of the applications incorporated by reference herein including for seasonal and/or date based greetings.

In operation, the video phone 130 determines if the called party is video phone enabled If the called party is not video phone enabled, just the audio track of the on-hold information may be sent to the called party. Where the calling party has a phone number which matches a customized on-hold indication stored in the database (either locally or at the NSP), the calling party receives customized on-hold information. The customized on-hold information may also be modified based on a particular date. For example, the customized on-hold information which is not date-modified may output standard on-hold information, while the customized on-hold information which is date-modified may have customized on-hold information to acknowledge a corporate sale and/or corporate special event.

After determining the video capabilities of the calling party, the on-hold information may be tailored to the particular capabilities of the calling party. For example, where the calling party is not a vision phone but only a video phone enabled phone/PC connected via a 28.8Kbps modem, the on-hold information may be cropped and/or the resolution reduced to allow standard phone equipped personal computers to receive video phone based on-hold information. The same protocol established between two or more video phones may also be used between a video phone and a personal computer equipped with a telephone. Telecommunication standards for these devices can be set in international standards organizations to enable wide use of the video phone. Alternatively, any known communication standard may be utilized such as an HTML-based system, an MPEG based system, H.323.

The following applications, filed concurrently herewith, are hereby incorporated by reference:

1. A Hybrid Fiber Twisted-pair Local Loop Network Service Architecture U.S. application Ser. No. 09/001,360, filed Dec. 31, 1997;
2. Dynamic Bandwidth Allocation for use in the Hybrid Fiber Twisted-pair Local Loop Network Service Architecture U.S. application Ser. No. 09/001,425, filed Dec. 31, 1997;
3. The VideoPhone U.S. application Ser. No. 09/001,905, filed Dec. 31, 1997,
4. VideoPhone Privacy Activator U.S. application Ser. No. 09/001,909, filed Dec. 31, 1997;
5. VideoPhone Form Factor U.S. application Ser. No. 09/001,583, filed Dec. 31, 1997;
6. VideoPhone Centrally Controlled User Interface With User Selectable Options U.S. application Ser. No. 09/001,576, filed Dec. 31, 1997;
7. VideoPhone User Interface Having Multiple Menu Hierarchies U.S. application Ser. No. 09/001,908, filed Dec. 31, 1997;
8. VideoPhone Blocker U.S. application Ser. No. 09/001,353, filed Dec. 31, 1997;
9. VideoPhone Inter-com For Extension Phones U.S. Patent application Ser. No. 09/001,358, filed Dec. 31, 1997;
10. Advertising Screen Saver U.S. application Ser. No. 09/001,574, filed Dec. 31, 1997;
11. VideoPhone FlexiView Advertising U.S. application Ser. No. 09/001,906, filed Dec. 31, 1997;
12. VideoPhone Multimedia Announcement Answering Machine (U.S. application Ser. No. 09/001,911, filed Dec. 31, 1997;
13. VideoPhone Multimedia Announcement Message Toolkit U.S. application Ser. No. 09/001,345, filed Dec. 31, 1997;
14. VideoPhone Multimedia Video Message Reception U.S. application Ser. No. 09/001,362, filed Dec. 31, 1997;
15. VideoPhone Multimedia Interactive Corporate Menu Answering Machine Announcement U.S. application Ser. No. 09/001,575, filed Dec. 31, 1997;
16. VideoPhone Multimedia Interactive On-Hold Information Menus U.S. application Ser. No. 09/001,356, filed Dec. 31, 1997;
17. VideoPhone Advertisement When Calling Video Non-enabled VideoPhone Users U.S. application Ser. No. 09/001,361, filed Dec. 31, 1997;
18. Motion Detection Advertising U.S. application Ser. No. 09/001,355, filed Dec. 31, 1997;
19. Interactive Commercials U.S. application Ser. No. 09/001,578, filed Dec. 31, 1997;
20. VideoPhone Electronic Catalogue Service U.S. application Ser. No. 09/001,421, filed Dec. 31, 1997;
21. A Multifunction Interface Facility Connecting Wideband Multiple Access Subscriber Loops With Various Networks (U.S. Patent application Ser. No. 09/001,422, filed Dec. 31, 1997);
23. Life Line Support for Multiple Service Access on Single Twisted-pair U.S. application Ser. No. 09/001,343, filed Dec. 31, 1997;

24. A Network Server Platform (NSP) For a Hybrid Fiber Twisted-pair (HFTP) Local Loop Network Service Architecture U.S. application Ser. No. 09/001,582, filed Dec. 31, 1997;
25. A Communication Server Apparatus For Interactive Commercial Service U.S. application Ser. No. 09/001,344, filed Dec. 31, 1997;
26. NSP Based Multicast Digital Program Delivery Services (U.S. application Ser. No. 09/001,580, filed Dec. 31, 1997);
27. NSP Internet, JAVA Server and VideoPhone Application Server U.S. application Ser. No. 09/001,354, filed Dec. 31, 1997;
28. NSP WAN Interconnectivity Services for Corporate Telecommuting (U.S. application Ser. No. 09/001,540, filed Dec. 31, 1997);
29. NSP Telephone Directory White-Yellow Page Services U.S. application Ser. No. 09/001,426, filed Dec. 31, 1997;
30. NSP Integrated Billing System For NSP services and Telephone services U.S. application Ser. No. 09/001,359, filed Dec. 31, 1997;
31. Network Server Platform/Facility Management Platform Caching Server U.S. application Ser. No. 09/001,419, filed Dec. 31, 1997;
32. An Integrated Services Director (ISD) Overall Architecture (U.S. application Ser. No. 09/001,417, filed Dec. 31, 1997).
33. ISD VideoPhone (Customer Premises) Local House Network (U.S. application Ser. No. 09/001,418, filed Dec. 31, 1997);
34. ISD Wireless Network U.S. application Ser. No. 09/001,363, filed Dec. 31, 1997;
35. ISD Controlled Set-Top Box U.S. application Ser. No. 09/001,424, filed Dec. 31, 1997;
36. Integrated Remote Control and Phone U.S. application Ser. No. 09/001,423, filed Dec. 31, 1997;
37. Integrated Remote Control and Phone User Interface U.S. application Ser. No. 09/001,420, filed Dec. 31, 1997;
38. Integrated Remote Control and Phone Form Factor U.S. application Ser. No. 09/001,910, filed Dec. 31, 1997;
39. VideoPhone Mail Machine (Attorney docket No. 3493.73170);
40. Restaurant Ordering Via VideoPhone (Attorney docket No. 3493.73171);
41. Ticket Ordering Via VideoPhone (Attorney docket No. 3493.73172);
42. Multi-Channel Parallel/Serial Concatenated Convolutional Codes And Trellis Coded Modulation Encode/Decoder U.S. application Ser. No. 09/001,342, filed Dec. 31, 1997;
43. Spread Spectrum Bit Allocation Algorithm U.S. application Ser. No. 09/001,842, filed Dec. 31, 1997;
44. Digital Channelizer With Arbitrary Output Frequency U.S. application Ser. No. 09/001,581, filed Dec. 31, 1997;
45. Method And Apparatus For Allocating Data Via Discrete Multiple Tones (filed U.S. application Ser. No. 08/997,167, filed Dec. 23, 1997;
46. Method And Apparatus For Reducing Near-End Cross Talk In Discrete Multi-Tone Modulators/Demodulators U.S. application Ser. No. 08/997,176, filed Dec. 23, 1997;

The present application is #16 on the above list.

In addition, the following two patent applications are hereby incorporated by reference:
1. U.S. Patent application Ser. No. 08/943,312 filed Oct. 14, 1997 entitled Wideband Communication System for the Home, to Robert R. Miller, II and Jesse E. Russell, and
2. U.S. Patent application Ser. No. 08/858,170, filed May 14, 1997, entitled Wide Band Transmission Through Wire, to Robert R. Miller, II, Jesse E. Russell and and Richard R. Shively.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. In a first phone configured for simultaneously teleconferencing with a plurality of parties, a method comprising the steps of:
   displaying a plurality of video windows on a display, each video window representing at least one of the parties; and
   displaying a link icon between at least two of the video windows responsive to an actual link being created between the parties represented by the at least two video windows, the actual link being associated with a telephone call, wherein the link icon represents an actual link between the phone and at least one of the parties, the actual link being controllable by selecting the link icon.

2. The method according to claim 1 wherein the steps of displaying are performed on a touch-screen display, the link icon being selectable by a user by touching the link icon.

3. The method according to claim 1 including the step of graphically indicating on the display when outgoing video from the videophone to at least one of the parties is muted.

4. The method of claim 3, wherein the step of graphically indicating includes the step of displaying on the display a video window representing the outgoing video that is sent to the at least one of the parties.

5. The method of claim 3, wherein the outgoing video being muted comprises one of a frozen video screen and a blank screen.

6. The method of claim 3, wherein the outgoing video being muted comprises one of an icon, text, a short repeating loop of video, intermittent freeze frame, slow motion video, and distorted video.

7. The method according to claim 1 including the steps of:
   receiving a video signal representing a video image from at least one of the parties; and
   displaying the video image in at least one of the video windows.

8. The method according to claim 1 wherein the videophone is coupled to a controller having a processor for selectively allowing the videophone to simultaneously teleconference with the parties.

9. The method according to claim 1 wherein the phone is capable of sending a private message to only one of the parties while the phone is teleconferencing with the plurality of parties.

10. The method according to claim 1 including displaying a link map, wherein a layout of the link map illustrates a topography of actual links among the phone and the parties.

11. The method of claim 10, further including zooming in to a selected portion of the link map such that the displayed link map illustrates only a zoomed-in portion.

12. The method of claim 10, further including filtering out at least one of selected parties and selected links from the link map such that the displayed link map does not illustrate filtered-out parties and links.

13. The method of claim 1, further including the step of automatically rearranging at least one of the shape, size, and arrangement of at least one of the plurality of video windows depending upon at least one of relative locations of the plurality of parties, a topography of the actual link, and which of the plurality of parties are an originating party.

14. The method of claim 1, wherein an amount of the plurality of video windows appearing on the display depends upon how many parties are teleconferencing with each other.

15. The method of claim 1, wherein the link icon includes one or more arrow heads depending upon one or more directions of communication of the actual link.

16. The method of claim 1, further including the step of displaying status associated with the actual link, including at least one of elapsed call time, party identification, line quality, and link type.

17. A phone configured for simultaneously teleconferencing with a plurality of parties, said phone comprising:
- a processor for generating a plurality of video windows, each video window representing at least one of the plurality of parties; and
- a display connected to the processor for displaying the plurality of video windows and for displaying a link icon between at least two of the video windows responsive to an actual link being created between the parties represented by the at least two video windows, the actual link being associated with a telephone call, wherein the link icon represents an actual link between said phone and at least one of the parties, the actual link being controllable by selecting the link icon.

18. The phone according to claim 17, wherein said display is a touch-screen display, the link icon being selectable by a user by touching the link icon.

19. The phone according to claim 17, wherein said display graphically indicates when outgoing video from said phone to at least one of the parties is muted.

20. The phone according to claim 17, wherein said phone is configured to receive a video signal representing a video image from at least one of the parties and display the video image in at least one of the video windows.

21. The phone according to claim 17, wherein said phone is coupled to a controller having a processor for selectively allowing said phone to simultaneously teleconference with the parties.

* * * * *